Oct. 19, 1965     T. A. REILLY ETAL     3,212,935
LEAK-RESISTANT DRY CELL
Original Filed May 1, 1961
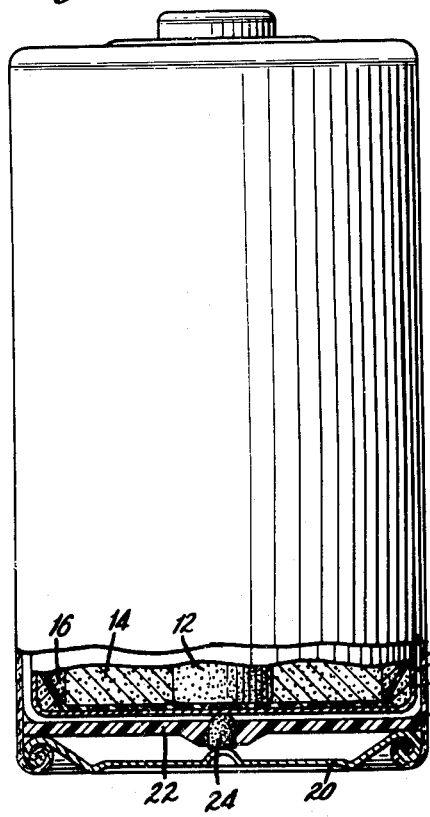
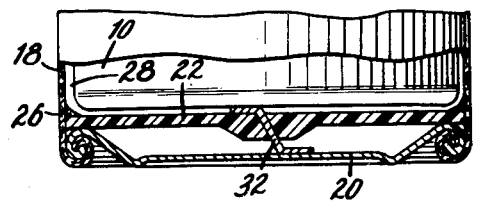
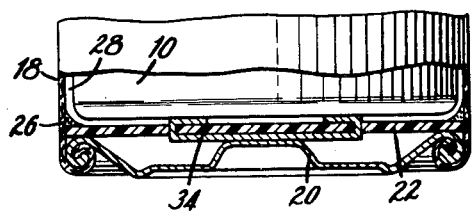
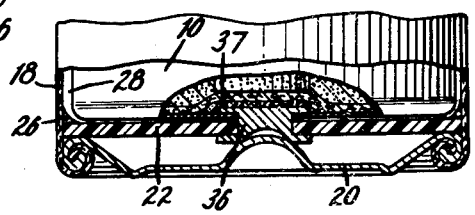
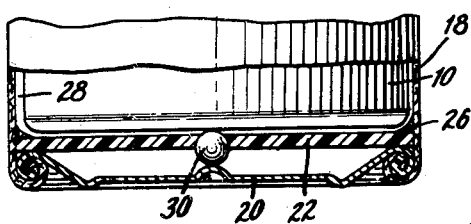
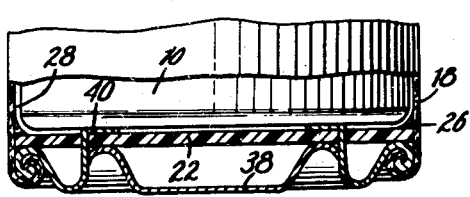
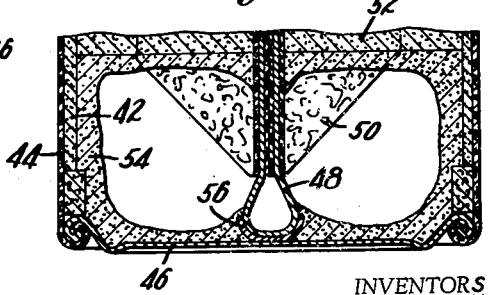
INVENTORS
THOMAS A. REILLY
JOHNSON R. BECKMAN
HARRY K. BISHOP
BY *John R. Haherty*
ATTORNEY United States Patent Office 3,212,935
Patented Oct. 19, 1965

3,212,935
LEAK-RESISTANT DRY CELL
Thomas A. Reilly, Bay Village, and Johnson R. Beckman, Cleveland, Ohio, and Harry K. Bishop, West Covina, Calif., assignors to Union Carbide Corporation, a corporation of New York
Original application May 1, 1961, Ser. No. 106,763, now Patent No. 3,115,429, dated Dec. 24, 1963. Divided and this application Nov. 7, 1963, Ser. No. 322,158
2 Claims. (Cl. 136—107)

This application is a division of application Serial No. 106,763, filed May 1, 1961, now Patent No. 3,115,429.

This invention relates to leak-resistant dry cells of the type having a closed container surrounding the cell proper.

The so-called Leclanché dry cell used for flash-lights, portable radios, photoflash and other devices has gone through an evolution of improvements during the past decade or more in an attempt by manufacturers to prevent leakage from the cell during and after its use. Despite the many proposals, however, that have been advanced, there still remains a need for a better leak-resistant dry cell.

One proposal that has been adopted commercially is to encase a conventional dry cell within a closed container comprising a non-corrodible jacket, a "false" bottom, and a top closure. The bottom of the cell container has been used for making electrical contact with the metal electrode of the cell, and for this purpose has been made of metal, for instance, steel. This construction, however, suffers from the disadvantage that the metal bottom is subject to being corroded and eventually perforated by liquid exudate from the cell. One suggestion that has been advanced is to make the container bottom of a non-corrodible metal. Such proposals, however, have not been practical, for they greatly increase the cost of manufacture of the cell. Other proposals have been made for protecting the bottom of the cell container from contact by liquid exudate, but those proposals thus far advanced have proven unsuitable because they defeat the purpose of the container bottom to make electrical contact with the metal electrode of the cell.

It is therefore the principal object of the invention to effectively protect the container bottom of a leak-resistant dry cell from corrosion, but without interference with the purpose of the container bottom to make electrical contact with the metal electrode of the cell.

Briefly, the above and other objects are achieved by the invention which comprises a shield for the container bottom of a leak-resistant dry cell and an electrical contact element positioned within the shield and making electrical contact between the container bottom and the metal electrode of the cell.

In the accompanying drawing:

FIG. 1 is a vertical elevation partially in section of a leak-resistant dry cell embodying the invention;

FIG. 2 is a similar view of the bottom portion only of a dry cell showing another embodiment of the invention;

FIG. 3 is similar to FIG. 2 showing another embodiment;

FIG. 4 is similar showing still another embodiment;

FIG. 5 is similar showing yet another embodiment;

FIG. 6 is similar showing a further embodiment; and

FIG. 7 is a vertical section of the bottom portion only of another dry cell construction embodying the invention.

Referring to the drawing and particularly to FIG. 1, a dry cell of a conventional construction comprising a cupped container-anode 10 of a consumable metal, for instance, zinc having therein a carbon electrode 12 embedded within a depolarizer mix 14 and an immobilized electrolyte 16 suitably in the form of a conventional "paste," is provided with a jacket 18 having locked thereto a metallic bottom plate 20. At the bottom of the cell and so placed as to define a barrier against contact of liquid exudate with the bottom plate 20 is a shield comprising a liquid-repellant disc 22 of a diameter sufficient to fit tightly within the lower edges of the jacket 18. A carbon or graphite button 24 is positioned within the disc 22 and makes contact with the bottom of the container-anode 10. The bottom plate 20 is of a conventional type having an indentation at its center secured in contact with the button 24. The disc 22 preferably is composed of a plastic material, for example, polyethylene, and has its peripheral edges sealed to the inner surfaces of the jacket 18, for instance, with wax as indicated at 26. During manufacture and before the bottom plate 20 is locked in place to the jacket 18, a thin layer of wax, for example, may also be poured over the disc 22 to further aid in preventing corrosion of the bottom plate 20.

The top closure for the cell is of a conventional construction locked to the jacket 18. The jacket 18 is non-corrodible, it being composed of a fibrous material, for example, paper, and fits the container-anode 10 rather loosely, thereby providing a supplementary chamber 28 for receiving liquid exudate from the cell.

As shown in FIGS. 2 to 7 inclusive, the principles of the invention may be achieved in a number of ways and are applicable to a variety of dry cells. For instance, referring to FIG. 2, a metal sphere 30 may be positioned within the disc 22 for making contact between the container-anode 10 and the bottom plate 20 similarly as shown in FIG. 1. Or, as shown in FIG. 3, a metal leaf spring 32 may be utilized. The leaf spring 32 in this construction provides for somewhat of a resilient contact as opposed to the rather rigid construction shown in FIG. 1, for example. FIG. 4 shows a construction in which a metal staple 34 is used. The staple 34 may be driven through the disc 22 by conventional stapling techniques during manufacture of the cells. As shown in FIG. 5, a metal rivet 36 may also be utilized. With this construction, it will be observed that the rivet 36 also serves to rigidly secure the disc 22 to the bottom of the container-anode 10. For the purpose of insulating the rivet 36 within the bottom of the container-anode 10 a thin layer 37 of wax, for example, is applied over it. The bottom plate 20 utilized in the constructions just described may differ somewhat from that illustrated in FIG. 1 depending upon the type of contact to be made. For example, in FIG. 3, a flat bottom plate 20 is used to make contact with the leaf spring 32. Or, as shown in FIG. 4, a bottom plate 20 having a flat indentation is utilized with the staple 34. In FIG. 6 an alternative construction is shown in which a bottom plate 38 having one or more lugs 40 punched through it is locked to the jacket 18. The lugs 40 pass through and are curled over on top of the disc 22 to make contact with the container-anode 10. This construction eliminates the use of a separate member for contacting the container-anode 10 and provides for a simple and inexpensive bottom closure for the cell container.

A different version of a dry cell embodying the invention is shown in FIG. 7. The dry cell which is shown is substantially disclosed and claimed in U.S. Patent No. 2,605,299, issued to J. P. Teas on July 29, 1952, and comprises a container electrode 42 of carbon molded in juxtaposition to and in adherent contact with the inner surfaces of a non-corrodible jacket 44 suitably of paper having a metallic bottom plate 46 locked thereto, the electrode 42 being suitably molded within the jacket 44 by injection molding techniques. A consumable metal electrode 48 having a generally X shaped cross section and provided with a conventional separator 50 of a bibulous paper is embedded within a depolarizer mix 52 which substantially fills the container-electrode 42. A shield comprising a seal 54 of wax, for example, overlies the inner surfaces of the bottom plate 46 and preferably also is applied over the depolarizer mix 52 and the bottom side walls of the container-electrode 42. A metal cup 56 is positioned within the seal 54 below the stem of the metal electrode 48 and makes contact between the metal electrode 48 and the bottom plate 46.

Thus, the invention provides an effective shield for the container bottom of a leak-resistant dry cell and at the same time provides for good electrical contact between the container bottom and the metal electrode of the cell.

An important feature of the invention is the utilization of an electrical contact element in the various constructions described which is resistant to corrosion and electrolytic attack by cell exudate which may collect between the shield and the bottom of the container-anode. As already indicated and shown in FIG. 1, carbon or graphite may be used for the contact element. Many other non-consumable and non-corrodible materials may also be used, for example, in the constructions shown in FIGS. 2 to 7 inclusive, the metal contact elements described may be made from such metals as titanium and chromium. Some metals like silver and lead and their alloys which possess a tendency to form protective barrier films on their surfaces may also be utilized. For instance, the metal sphere used in the construction shown in FIG. 2 may be composed of lead or lead base alloys. A desirable alloy is a lead antimony alloy containing about 6% to 12% antimony.

Another advantage derived from the invention is the elimination of the presence of cell exudate at the bottom of the cell container as a factor which has contributed towards the generation of gas and the build up of gas pressure within the cell container. In prior dry cell constructions, liquid exudate from the cell has been permitted to contact both the metal electrode and the container bottom of the cell, which being of different metals constitute an electrolytic couple which has caused gas to be generated. The present construction avoids this difficulty by the interposition of a shield between the electrode and the container bottom.

A dry cell embodying the invention may be manufactured in several different ways. For example, it is practical to make the shield discs described by conventional molding techniques and to incorporate the contact element during the molding operation. Another way in which the contact element may be incorporated is to press-fit it within the shield disc before or after it is placed within the bottom of the cell. This latter technique is generally preferred when the shield disc is made of a plastic material, for the pressure brought to bear upon the disc serves to seal the contact element against leakage.

A number of dry cells embodying the invention have been made and tested under severe conditions. These tests proved the effectiveness of the invention for good electrical contact with the bottom of the cell container was maintained and no evidence of corrosion or perforation of the container bottom was observed during the tests.

It will be understood that many changes and modifications of the dry cell constructions described herein may be made without departing from the spirit and scope of the invention.

What is claimed is:

1. In a leak-resistant dry cell comprising a jacket, a container-electrode of carbon in juxtaposition to and in adherent contact with said jacket having therein a depolarizer mix and a second electrode of a consumable metal embedded within said depolarizer mix, and a metallic bottom plate locked to said jacket, the combination of a wax shield positioned over said bottom plate and an electrical contact element positioned within said wax shield in contact with said second electrode and making electrical contact with said bottom plate, said electrical contact element being composed of a material selected from the group consisting of titanium, chromium, silver and lead, and the non-metallic elements of carbon and graphite.

2. A leak-resistant dry cell as defined by claim 1 in which said second electrode is of a generally X-shaped cross section having a stem positioned at the bottom of said cell, and in which said contact element comprises a metal cup positioned over said stem.

References Cited by the Examiner

UNITED STATES PATENTS

| | | | |
|---|---|---|---|
| 2,605,299 | 7/52 | Teas | 136—107 |
| 2,644,024 | 6/53 | Schumacher et al. | 136—107 |
| 2,807,658 | 9/57 | Hatfield | 136—134 |
| 2,900,434 | 8/59 | Zimmerman et al. | 136—107 |

JOHN H. MACK, *Primary Examiner.*